INVENTORS
Robert F. Hahnau and
Edwin D. O'Toole

BY Mason, Fenwick & Lawrence
ATTORNEYS

Feb. 14, 1961 R. F. HAHNAU ET AL 2,971,259
METHOD AND APPARATUS FOR DETERMINING
THE POSITION OF SEWER LEAKS
Filed July 10, 1959 2 Sheets-Sheet 2

INVENTORS
Robert F. Hahnau and
Edwin D. O'Toole

BY Mason, Fenwick & Lawrence
ATTORNEYS 2,971,259
Patented Feb. 14, 1961

2,971,259

METHOD AND APPARATUS FOR DETERMINING THE POSITION OF SEWER LEAKS

Robert F. Hahnau, Hollywood, and Edwin D. O'Toole, North Miami, Fla., assignors to Industrial Pipe Repair Corporation, Fort Lauderdale, Fla., a corporation of Florida Filed July 10, 1959, Ser. No. 826,305

8 Claims. (Cl. 33—1)

The present invention relates in general to methods and apparatus for detecting and measuring the location of any fluid infiltration faults and the like in subterranean pipe lines such as sewer lines to permit external pipe repairing methods to be performed, and more particularly to methods and apparatus for detecting points of infiltration of fluids into subterranean pipe lines and the like and location of the ground surface position directly above the point of fluid infiltration to permit external repairing of the infiltration site. The present invention particularly has to do with subterranean sewer pipe lines having manholes spaced substantial distances along the length of the line.

Surface and subsurface water infiltrating into sewer lines represents one of the most vexing problems facing private and public utilities. Infiltration generally results from exterior hydrostatic pressure or surcharges in the line, accompanied by a deteriorated joint. When the measurable flow of water in the line exceeds design specifications, many adverse effects may occur. For example, excess flow may adversely affect the operation of biological filter plants in the sewer system. Biological filter plants are designed to operate efficiently and economically in consideration of certain maximum and minimum rates of sewage flow. Infiltration introduced by rainfall or high water tables upsets the delicate chemical balance necessary for reducing raw effluent. Additionally, pumps and other related sewage treatment plant equipment wear out at a rate faster than depreciation allows when called upon to operate continually above design specifications. Treated water effluent frequently fails to meet accepted standards when surcharges of infiltrating water require frequent recalculation of organic loading. Also, pumping and power costs may become excessive in both gravity flow and lift station operations when infiltration is primarily in the sewage flow.

The conventional method of repair of subterranean pipe lines to correct infiltration problems has been to calculate at strategic locations the general area of infiltration and then to excavate along this area to the pipe line and make the repair. This is a most time-consuming and expensive method of correcting faults in subterranean lines, frequently requiring about two days to fix a serious leak, since the calculations of the area of infiltration only established the general area where the infiltration is occurring and are not sufficiently precise to permit pinpointing the site of infiltration without extensive area excavation.

An object of the present invention is the provision of a novel method and apparatus for precisely locating the site of infiltration or faults in subterranean pipe lines to permit external repairing of the infiltration or fault areas.

Another object of the present invention is the provision of a novel method and apparatus for rapidly and accurately locating the site of faults in subterranean pipe lines to permit repairing of the fault by external application of sealing material to the fault area through conduits driven underground to the pinpointed fault site.

Another object of the present invention is the provision of a novel method and apparatus for rapidly and accurately locating the site of faults in subterranean pipe lines to permit repairing of the fault by external application of sealing material to the fault area through conduits driven underground to the pinpointed fault site, wherein means are provided for visually monitoring the internal condition of the pipe line at the fault area during application of the sealing compound.

Other objects, advantages and capabilities of the present invention will become apparent from the following detailed description taken in conjunction with the accompanying drawings illustrating one preferred embodiment of the invention.

The method of detection and measurement of the location of faults in underground sewer lines and the like contemplated by the present invention, which is designed to provide rapid pinpointing of the site of infiltration or exfiltration and repair of the fault site, and, in one specific embodiment, monitoring of the condition of the pipe line during repair, involves location of infiltration or exfiltration points by an underground survey with a remote controlled image-producing device which is drawn through the pipe, conduit or encasement. By noting the location of the image-producing device in relation to the occurrence of an image showing infiltration or exfiltration, the distance from a selected surface reference point and the location of the leak site can be computed. The distance from the surface reference point to the leak site is then measured out on the ground or pavement above the submerged or underground pipe along a surface line corresponding to the axis of the underground pipe, and pipes are driven into the ground at the site to the depth of the underground pipe line, preferably by the use of jetting systems, and then sealing agents or compounds are forced under high pressure through these pipes down to the point of infiltration or exfiltration to completely encase the pipe or conduit or at least to encase the fault area of the pipe line.

Figure 1:
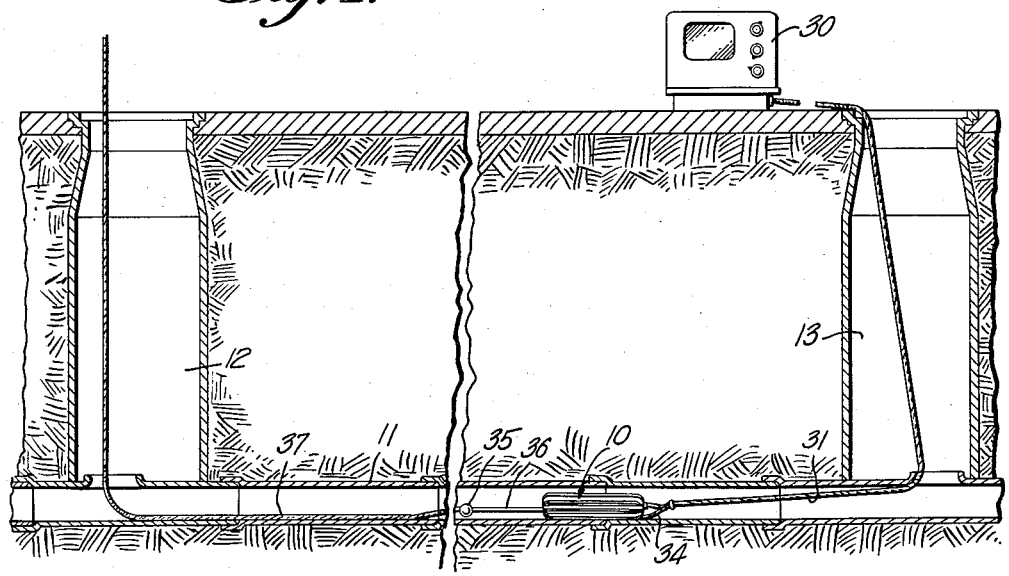
Figure 1 is a longitudinal section view through a pipe line showing one form of apparatus of the present invention in use.

In a preferred form of the invention, the image-producing device which is to be drawn through the submerged pipe line is in the form of a portable miniature television camera, indicated generally by the reference character 10, which is adapted to be drawn through a submerged pipe line, such as the sewer line section 11 shown in Figure 1, located between two successive manholes 12 and 13. The television camera unit 10 may take the specific form illustrated in detail in Figures 2, 3 and 4 of the drawings, wherein the camera unit comprises an outer cylindrical casing or shell 14, which may be formed of metal, Plexiglas or other suitable material, having a rear closure plate 15 at one end thereof which is removably secured to the casing 14, for example, by bolts extending into suitable threaded sockets in the mounting lugs carried by the casing 14. The opposite end of the casing 14 removably supports a Plexiglas or plate-glass face plate 16 suitably bolted to the casing 14 and preferably having an inwardly offset circular central portion 17 spaced inwardly from and in parallelism with an annular peripheral portion 18. Suitable gaskets are provided between the casing 14 and the adjacent portions of the rear closure plate 15 and the face plate 16 to seal the interior of the casing 14 and render it waterproof. An annular lamp mounting plate 19 is fixed peripherally to the inner wall of the casing 14 and is preferably disposed flush with the central offset portion 17 of the face plate 16, and supports a plurality of flood lamps 20 having suitable reflectors 21, if desired, associated therewith, disposed in an annular path surrounding the central offset portion 17 of the face plate and directed forwardly along the axis of the casing 14 to provide intense illumination forwardly of the casing. A conventional TV camera 22, which is preferably of very small size, is supported with its lens barrel 23 in axial alignment with the axis of the casing 14 and immediately rearwardly of the central offset portion 17 of the face plate 16 by suitable supporting blocks or ribs projecting inwardly from the wall of the casing 14. These camera supports may take the form illustrated in Figures 2 to 4 and comprise a pair of longitudinally spaced and transversely arranged blocks 24' and 24 having arcuate lower edges conforming to the curvature of the casing 14 and a longitudinally directed block 25 extending therebetween and located below the axis of the casing 14 to form a support for the bottom of the camera 22, together with longitudinal side supports 26 and 27 and a depending top support 28.

Figure 2:
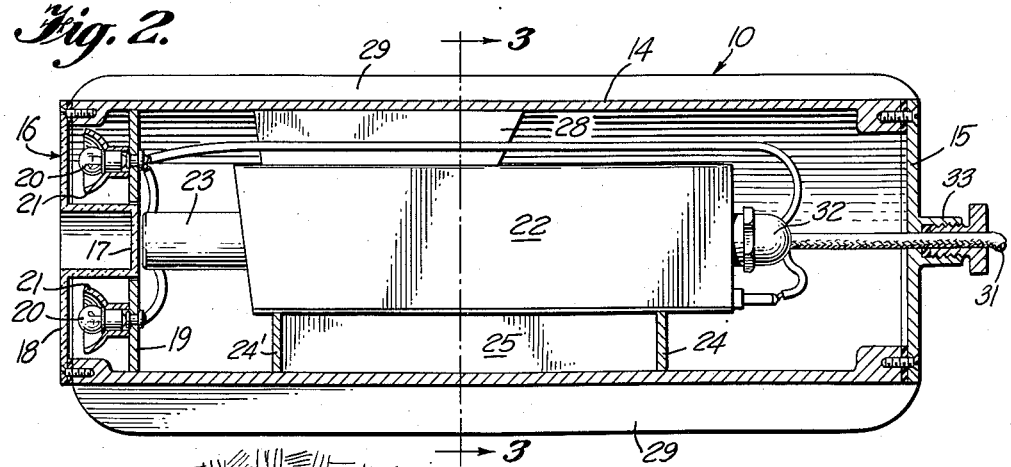
Figure 2 is a longitudinal section view of the television camera unit employed in connection with the practice of the present invention.
Figure 3:
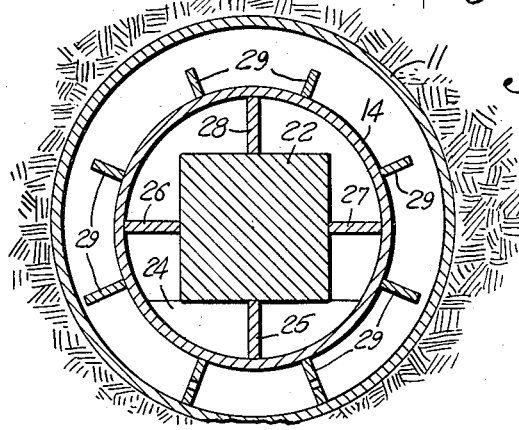
Figure 3 is a transverse vertical section view of the camera unit, taken along the line 3—3 of Figure 2.
Figure 4:
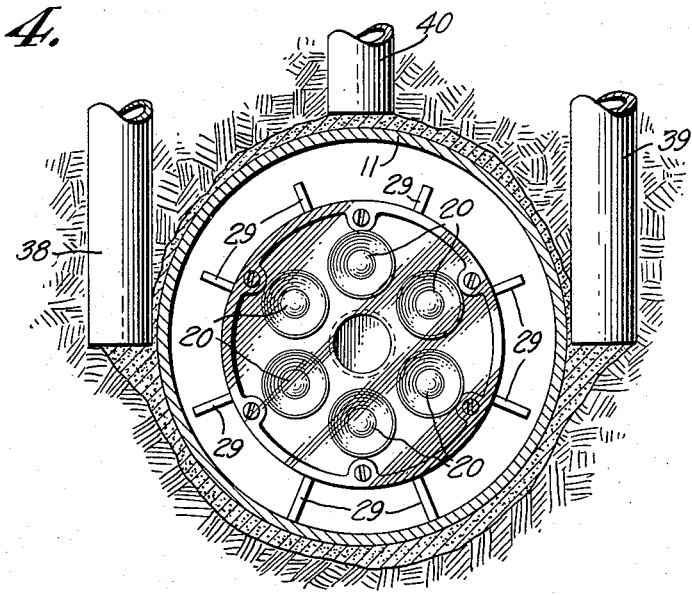
Figure 4 is a front elevation of the camera unit showing a portion of a sewer line in section with jetting pipes located adjacent the sewer line in position for encasing a fault site.
Figure 5:
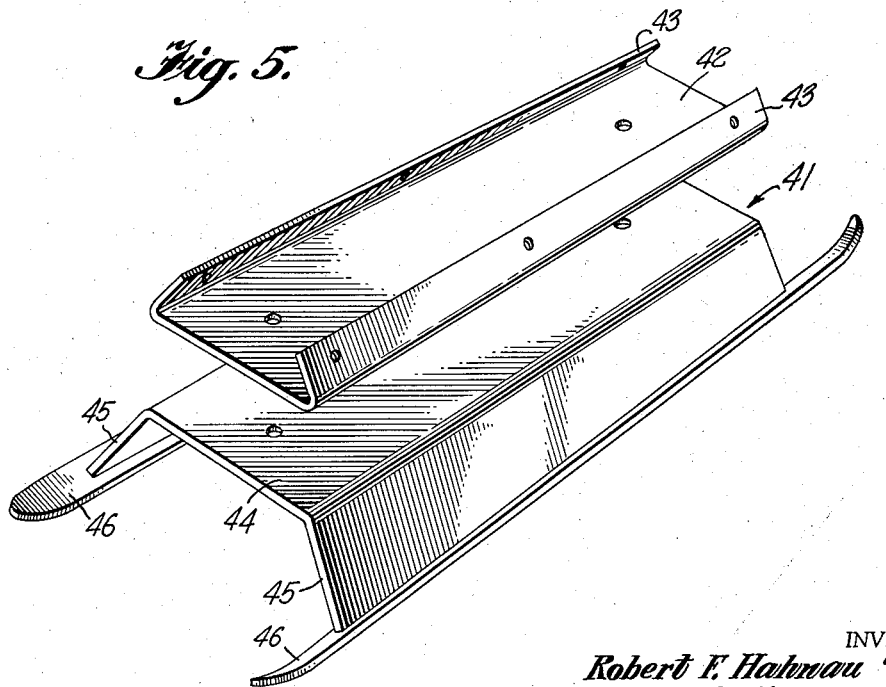
Figure 5 is a perspective view of a removable sled which may be used to support the camera unit in particular installations.

A plurality of longitudinal rib-like skids 29 project radially from the casing 14 to slidably support the casing for movement through the sewer line and prevent jamming of the camera unit within the pipe line, the skids 29 having rounded leading and trailing edges of the general form illustrated in Figure 2. The skids may be formed of metal, Plexiglas or like material and progressively increase in width from the bottom to the top of the casing 14 as illustrated in Figures 3 and 4, so as to dispose the medial axis of the casing 14 and the TV camera 22 eccentrically below the central axis of the cylindrical path defined by the outwardly projecting or runner edges of the skids 29. This tends to maintain camera 22 in erect position so as to minimize tilting or inversion of the image produced on the screen of a TV receiver 30 arranged in a closed circuit television network with the camera 22 and disposed for example in a truck or other suitable conveyance at ground level.

In one preferred embodiment of the invention, the camera unit casing 14 has an outer diameter of 5¼ inches and is of sufficient length to house a television camera such as the Dumont TC–200 television camera having a width of about 3 inches, a height of about 3½ inches and a length of about 10 inches. The depth of the skids 29 in this embodiment ranges from a minimum of ⅝ inch to a maximum of ¾ inch.

A supply cable 31, having a plug 32 connected to a suitable jack on the rear of the camera 22, contains the conductors for supplying power and control signals to the camera 22 and the lamps 20 and for leading out the signal from the camera 22 to the receiver 30. The cable 31 is led through a suitable packing gland fitting 33 at the center of the rear closure plate 15, through the sewer line 11, and out one of the manholes, for example, the manhole 13 located downstream in the direction of flow through the line 11. A load connector cable 34 is secured at one end to the supply cable 31 outwardly of the packing gland fitting 33 and is secured at its other end to two of the lower skids 29, and a slack section is provided in the supply cable 31 between its juncture with the load connector cable 34 and the packing gland fitting 33 so that the plug 32 is relieved of any strain when the camera unit 10 is drawn through the sewer line 11 by means of the supply cable 31.

A suitable target 35, which may be in the form of a brightly colored ball or other shaped object, is coupled by a line 36 of selected length to the lower skids 29 or some portion of the casing 14 at the front end of the casing, the line 36 being of such length that the target center is spaced precisely a determined, fixed distance, for example six feet, from the face of the image tube in the TV camera 22. A tow cable 37 extends from the target 35 through the sewer line 11 in a direction opposite the TV unit supply cable 31 and up through the other manhole 12 to permit controlled movement of the camera unit 10 toward the upstream manhole 12.

Preferably the TV supply cable surface 31 is provided with legible markings at, for example, one foot increments indicating the distance in feet from the target 35. It will be understood that the tow cable 37 may be alternatively or additionally marked in feet.

In practicing the method of the present invention with the apparatus hereinabove described, and assuming that the sewer line section 11 between the two manholes 12 and 13 has been identified as the section in which infiltration is occurring, the supply cable 31 is strung through the pipe section 11 from the manhole 12 which is upstream from the direction of sewage flow to the manhole 13 and a man is stationed at the lower manhole 13, or at each of the manholes 12 and 13, who is in communication with the operator at the TV receiver 30 by two-way telephone or other suitable communication medium. The TV camera unit 10 is then drawn slowly through the sewer line 11 from the starting manhole 12 to the downstream manhole 13 while the image on the screen of the TV receiver 30 is being constantly monitored. When the infiltration is observed on the TV receiver screen, the operator drawing on the supply cable 31 is guided by the receiver monitor through the communication medium to dispose the target 35 directly at the point of infiltration in the sewer line 11, the tow cable 37 being available to draw the camera unit in the upstream direction if it is desired at any point to cause the camera unit to back up in the line.

A plumb bob is then dropped at the center of the manhole through which the supply cable 31 is drawn and a measurement is taken on the supply cable 31 of the precise distance to the target 35. A line is then struck along the ground between the centers of the two manholes 12 and 13, and the distance to the target determined by reading of the supply cable markings is then carefully taped or measured along the line between the centers of the two manholes and the point on the ground surface directly above the infiltration point is marked. To accomplish the external repair of the fault site, the pipe width of the sewer line 11 is then marked out at this point on the ground, and three lengths of small pipe 38, 39, 40, for example 1½ inch or 2 inch pipe, are pushed, hammered, or jettied by water pressure and compressed air down to the sewer line 11, the pipe 38 and 39 being located one on each side of the sewer line 11 and the central pipe 40 being located to terminate immediately above the center of the sewer line 11.

The three lengths of jetting pipe 38, 39, 40 are then connected in unison or separately to a mud-jack or grout pump, and a sealing composition such as a mixture of cement and asbestos or a polymerized vinyl plastic is pumped down the jetting pipes 38, 39, 40 to the point of infiltration. In practice, a predetermined amount of sealing composition is pumped down the jetting pipes 38, 39, 40 to the sewer line 11 and then the three pipes 38, 39 and 40 are raised six or eight inches and the pumping of the substance is continued, this procedure being repeated as necessary, until the sewer line 11 is completely encased with the sealing compound. The jetting pipes 38, 39, 40 are then removed and the holes which they left are filled in.

In the event the jetting pipes were driven through pavement, the holes left are so small that very inexpensive patchwork will suffice to repair the pavement. By constantly maintaining visual observation of the condition of the interior of the sewer line on the TV receiver 30, the admittance of any extraneous material into the sewer line may be prevented or controlled. If, for example, it is noted during the pumping of sealing composition to the sewer line that some sealing composition is infiltrating into the pipe line, an inflatable bag or other means for providing pressure from internally of the sewer line against the area of the break may be introduced into the sewer line 11 and the encasing procedure then continued.

It will be appreciated that in some types of soils, a mere jetting of pipes 38, 39 and 40 to the sides and the top of the sewer line 11 may not give enough coverage to correct the infiltration fault, as for example where the soil has little porosity and the infiltration site is at the bottom of the sewer pipe. In such cases, the location of the infiltration fault is made apparent by the image on the TV receiver screen, and the side jetting pipes 38 and 39 may either be driven to the level of the bottom of the sewer line 11 or may be angled-in to terminate closer to the bottom of the sewer line 11 to attempt to jet the sealing composition to the exact leak spot.

The TV camera unit 10 of the construction specifically described above is designed and dimensioned for standard size sewer piping encountered in most localities. In the event it is desired to use the unit to inspect or locate fault sites in larger underground pipe lines, for example 18 inch and greater inner diameter pipe, the unit 10 may be conveniently used by providing a removable sled 41 having an upwardly opening channel-shaped base 42 including radial flanges 43 spaced appropriately from each other and appropriately inclined to receive the two lowermost skids 29 therebetween, and a downwardly opening, generally channel-shaped portion 44 secured to the base 42 and having downwardly and outwardly inclined flanges 45 terminating at their lower ends in elongated skis 46. The removable sled 41 will preferably have suitable tapped openings in the flanges 43 of the base 42 adapted to register with similar tapped openings in the two lowermost skids 29 to receive bolts or other suitable fastening means therethough.

It will be appreciated that, as an alternative arrangement, this general method of sewer leak detection may be practiced by using a special sealed waterproof camera unit in place of the TV camera unit 10, wherein a photographic camera located within a waterproof casing is drawn through the pipe line, and is actuated by a suitable remote control electrical system or the like at periodical intervals, for example, every four, six or twelve feet, to photograph the interior of the pipe line. Such a system would, of course, require an automatic or remote control film advancing mechanism which would advance strip film to expose another frame following each actuation of the camera shutter. The optical axis and field of view of the photographic camera would be so arranged that the successive photographs are of overlapping areas so that the developed negatives, by noting their chronological order and the distances as determined from a marked tow cable at which the successive photographs were taken, can be used to compute the location of the infiltration or exfiltration point. To provide the desired precision, however, it may be necessary to use a target of similar point of reference which will be imaged in the photographic field to facilitate location of the fault point. It will be appreciated however, that such a photographic scheme for surveying the condition of the sewer line interior is not as desirable as the closed circuit television scheme, due to the additional time loss introduced by the requirement that the photographic film be developed, and due to the inability to continuously monitor the condition of the pipe line interior at the fault point during the repair procedure.

While but one specific embodiment of the invention has been particularly shown and described, it will be apparent that various modifications may be made therein within the spirit and scope of the invention, and it is desired, therefore, that only such limitations be placed on the invention as are imposed by the prior art and set forth in the appended claims.

What is claimed is:

1. The method of detecting and measuring the location of any fluid infiltration faults and the like in subterranean pipe lines extending generally parallel to the ground surface to provide measurement data for locating the ground surface position directly above the fault site to permit external repair of the pipe line at the fault site, comprising the steps of drawing along the length of a subterranean pipe line between two axially spaced access openings at the opposite ends of the pipe line a target body, sensing at a location within the pipe line disposed a known fixed distance along the axis of the pipe line from the target body a composite image of the target body and the surrounding internal surface of the pipe line together with objects in the region within the pipe line adjacent the target body, producing at a remote location above the ground surface a reproduced image of the composite image sensed within the pipe line, observing the reproduced image to detect the conditions existing in the pipe line adjacent the target body, aligning the target body transversely of the axis of the pipe line with any infiltration fault site disclosed in the reproduced image by moving the target body axially along the pipe line while observing the spatial relationship of the imaged target body and fluid infiltration condition in the reproduced image, and measuring at the pipe line level the distance along the pipe line from the target body to a selected vertical reference axis adjacent one end of the pipe line when the target body is aligned with the infiltration fault site.

2. The method of detecting and measuring the location of any fluid infiltration faults and the like in subterranean pipe lines extending generally parallel to the ground surface and determining from the measurement the location of the ground surface position directly above the fault site from which hollow jetting pipes may be forced downwardly through the ground to points adjacent the exterior of the pipe line at the fault site and a sealing composition forced downwardly under pressure through the jetting pipes to encase the exterior wall of the pipe line at the fault site, comprising the steps of drawing along the length of a subterranean pipe line between two axially spaced access openings at the opposite ends of the pipe line a target body, sensing at a location within the pipe line disposed a known fixed distance along the axis of the pipe line from the target body a composite image of the target body and the surrounding internal surface of the pipe line together with objects in the region within the pipe line adjacent the target body, producing at a remote location above the ground surface a reproduced image of the composite image sensed within the pipe line, observing the reproduced image to detect the conditions existing in the pipe line adjacent the target body, aligning the target body transversely of the axis of the pipe line with any infiltration fault site disclosed in the reproduced image by moving the target body axially along the pipe line while observing the spatial relationship of the imaged target body and fluid infiltration condition in the reproduced image, measuring at the pipe line level the distance along the pipe line from the target body to a selected vertical reference axis adjacent one end of the pipe line when the target body is aligned with the infiltration fault site, and measuring along the ground surface along the vertically projected axis of the pipe line the determined distance from the vertical reference axis to the fault site, to establish the location at which jetting pipes should be introduced into the ground to position their lower ends adjacent the fault site.

3. Apparatus for producing observable images of the interior of a subterranean pipe line extending generally parallel to the ground surface between two axially spaced access openings at the opposite ends of the pipe line continuously during drawing of the apparatus along the length of the pipe line to detect the site and character of any fluid infiltration fault areas therein and measure the location thereof along the pipe line axis comprising an elongated waterproofed casing of smaller diameter than the pipe line inner diameter having a transparent window at one end of said casing, a television camera supported against displacement within said casing having a lens directed toward said transparent window at substantially the center thereof, light source means carried by said casing to illuminate the interior of the pipe line in the area around said transparent window, means projecting from the exterior of said casing bearing upon the inner surface of the pipe line to orient the casing to direct the optical axis of the television camera along the axis of the pipe line, a target member lying in the field of view of said camera connected by a cable to said casing at the front end thereof and spaced a selected distance from the lens of said camera, a tow cable extending from said target to pass outwardly through one end of the length of pipe line, a supply cable extending from the rear end of said casing to pass through the other end of said length of pipe line for drawing said casing toward said other end and for supplying control signals and power to said camera and light source means, means located above the surface of the ground and intercoupled through said supply cable with said camera for producing an observable image of the image recorded in said camera, and means for indicating distances along at least one of said cables from said target.

4. Apparatus for producing observable images of the interior of a subterranean pipe line extending generally parallel to the ground surface between two axially spaced access openings at the opposite ends of the pipe line continuously during drawing of the apparatus along the length of the pipe line to detect the site and character of any fluid infiltration fault areas therein and measure the location thereof along the pipe line axis comprising an elongated cylindrical casing of smaller diameter than the pipe line inner diameter having a transparent plate closing the front end of said casing and a cover plate closing the rear end of said casing, means sealing said casing against leakage of fluid into the casing, a television camera supported against displacement within said casing having a lens directed toward said transparent plate at substantially the center thereof, a plurality of light sources disposed inwardly of said transparent plate in surrounding relation to said lens to illuminate the interior of the pipe line in the area around said transparent plate, a plurality of elongated radially extending skids projecting from the exterior of said casing having skid surfaces to engage the interior walls of the pipe line and orient said casing to direct the optical axis of the television camera along the axis of the pipe line, a target member lying in the field of view of said camera connected by a cable to said casing at the front end thereof and spaced a selected distance from the lens of said camera, a tow cable extending from said target to pass outwardly through one end of the length of pipe line, a supply cable extending from the rear end of said casing to pass through the other end of said length of pipe line for drawing said casing toward said other end and for supplying control signals and power to said camera and light sources, means located above the surface of the ground and intercoupled through said supply cable with said camera for producing an observable image of the image recorded in said camera, and distance markings on said supply cable denoting distance from said target to facilitate measurement of the location of the target within the pipe line from a selected reference point adjacent said other end of the pipe line.

5. Apparatus for producing observable images of the interior of a subterranean pipe line extending generally parallel to the ground surface between two axially spaced access openings at the opposite ends of the pipe line continuously during drawing of the apparatus along the length of the pipe line to detect the site and character of any fluid infiltration fault areas therein and measure the location thereof along the pipe line axis comprising an elongated cylindrical casing of smaller diameter than the pipe line inner diameter having a transparent plate closing the front end of said casing and a cover plate closing the rear end of said casing, means sealing said casing against leakage of fluid into the casing, a television camera supported against displacement within said casing having a lens directed toward said transparent plate at substantially the center thereof, a plurality of light sources disposed inwardly of said transparent plate in surrounding relation to said lens to illuminate the interior of the pipe line in the area around said transparent plate, a plurality of elongated radially extending rib-like skids projecting from the exterior of said casing having skid surfaces rounded at the leading and trailing edges thereof and extending the length of the casing to engage the interior walls of the pipe line and arranged in a substantially circular path having its center located eccentrically below the central axis of said casing to resist tilting of said camera and casing about the axis of the pipe line, a target member lying in the field of view of said camera connected by a cable to said casing at the front end thereof and spaced a selected distance from the lens of said camera, a tow cable extending from said target to pass outwardly through one end of the length of pipe line, a supply cable extending from the rear end of said casing to pass through the other end of said length of pipe line for drawing said casing toward said other end and for supplying control signals and power to said camera and light sources, means located above the surface of the ground and intercoupled through said supply cable with said camera for producing an observable image of the image recorded in said camera, and distance markings on said supply cable denoting distance from said target to facilitate measurement of the location of the target within the pipe line from a selected reference point adjacent said other end of the pipe line.

6. The method of detecting and measuring the location of any fluid infiltration faults and the like in subterranean pipe lines extending generally parallel to the ground surface comprising the steps of drawing along the length of a subterranean pipe line between two axially spaced access openings at the opposite ends of the pipe line a television camera unit having a television camera disposed with its optical axis extending generally along the axis of the pipe line and having a target disposed a known fixed distance from the television camera in the field of view thereof to be imaged by the television camera along with the image of the pipe line interior, observing the image produced by the television camera at a television monitor located above the ground surface and receiving image producing signals from the television camera to detect the conditions existing in the pipe line adjacent the target, and measuring at the pipe line level the distance along the pipe line from the target to a selected vertical reference axis adjacent one of the access openings.

7. The method of detecting and measuring the location of any fluid infiltration faults and the like in subterranean pipe lines extending generally parallel to the ground surface for locating the ground surface position directly above the fault site to permit external repair of the pipe line at the fault site comprising the steps of drawing along the length of a subterranean pipe line between two axially spaced access openings at the opposite ends of the pipe line a television camera unit having a television camera disposed with its optical axis extending generally along the axis of the pipe line and having a target disposed a known fixed distance from the television camera in the field of view thereof to be imaged by the television camera along with the image of the pipe line interior, observing the image produced by the television camera at a television monitor located above the ground surface and receiving image producing signals from the television camera to detect the conditions existing in the pipe line adjacent the target, aligning the target with any infiltration fault site imaged at the television monitor by moving of the television camera unit axially along the pipe line while observing the relationship of the imaged target and fluid infiltration conditions at the television monitor, and measuring at the pipe line level the distance along the pipe line from the target to a selected vertical reference axis adjacent one end of the pipe line when the target is aligned with the infiltration fault site.

8. The method of detecting and measuring the location of any fluid infiltration faults and the like in subterranean pipe lines extending generally parallel to the ground surface and determining from the measurement the location of the vertical ground surface projection of the fault site from which hollow jetting pipes may be forced downwardly through the ground to points adjacent the exterior of the pipe line at the fault site and a sealing composition forced downwardly under pressure through the jetting pipes to encase the exterior wall of the pipe line at the fault site, comprising the steps of drawing along the length of a subterranean pipe line between two axially spaced access openings at the opposite ends of the pipe line a television camera unit having a television camera disposed with its optical axis extending generally along the axis of the pipe line and having a target disposed a known fixed distance from the television camera in the field of view thereof to be imaged by the television camera along with the image of the pipe line interior, observing the image produced by the television camera at a television monitor located above the ground surface and receiving image producing signals from the television camera to detect the conditions existing in the pipe line adjacent the target, aligning the target with any infiltration fault site imaged at the television monitor by movement of the television camera unit axially along the pipe line while observing the relationship of the imaged target and fluid infiltration conditions at the television monitor, measuring at the pipe line level the distance along the pipe line from the target to a selected vertical reference axis adjacent one end of the pipe line when the target is aligned with the infiltration fault site, and measuring along the ground surface along the vertically projected axis of the pipe line the determined distance from the vertical reference axis to the fault site to establish the location at which jetting pipes should be introduced into the ground to position their lower ends adjacent the fault site.

References Cited in the file of this patent

UNITED STATES PATENTS

| | | |
|---|---|---|
| 2,632,801 | Donaldson | Mar. 24, 1953 |
| 2,849,530 | Fleet | Aug. 26, 1958 |
| 2,917,085 | Douse | Dec. 15, 1959 |

Notice of Adverse Decision in Interference

In Interference No. 93,851 involving Patent No. 2,971,259, R. F. Hahnau and E. D. O'Toole, Method and apparatus for determining the position of sewer leaks, final judgment adverse to the patentees was rendered June 1964, as to claim 5.

[*Official Gazette August 25, 1964.*]